UNITED STATES PATENT OFFICE.

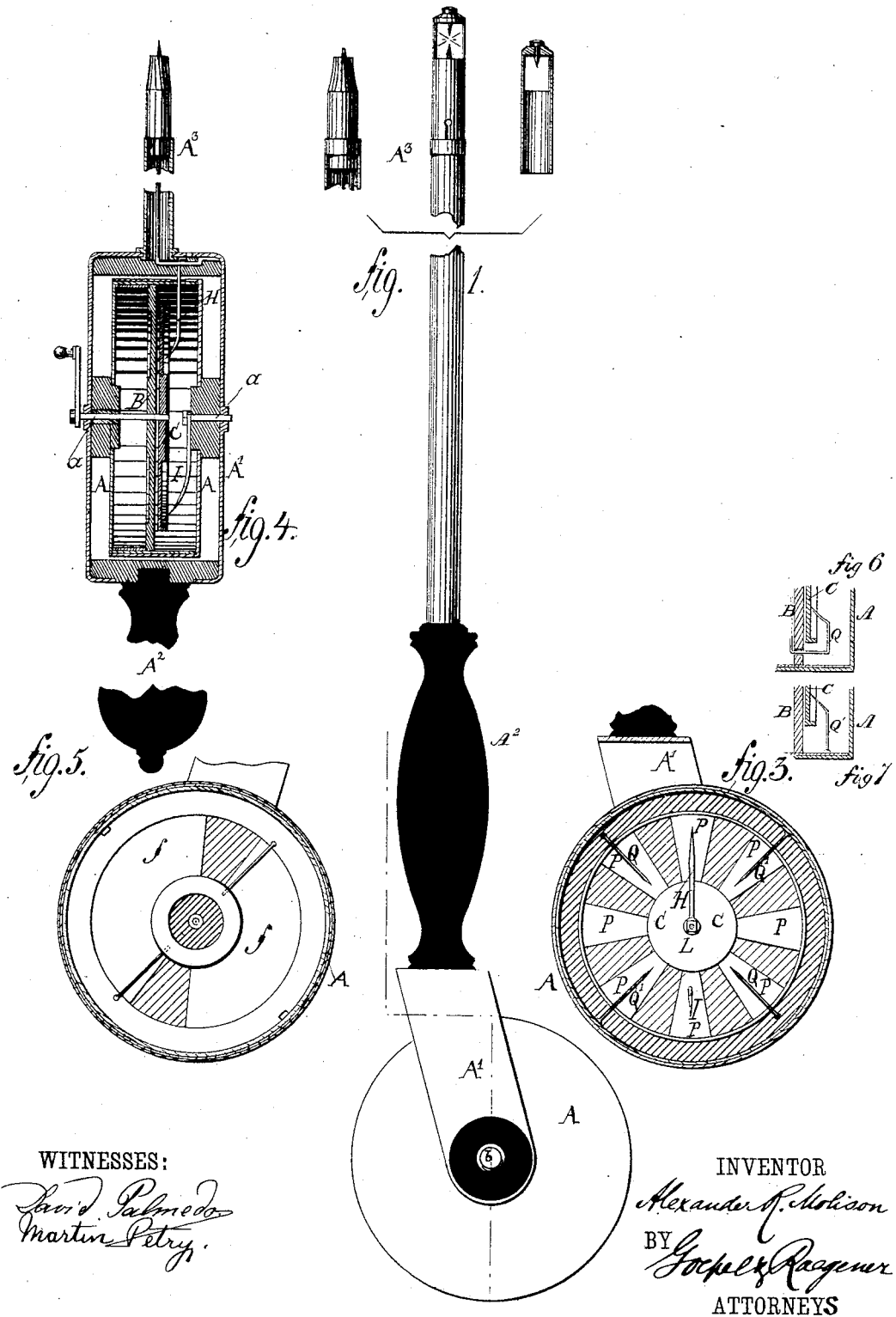

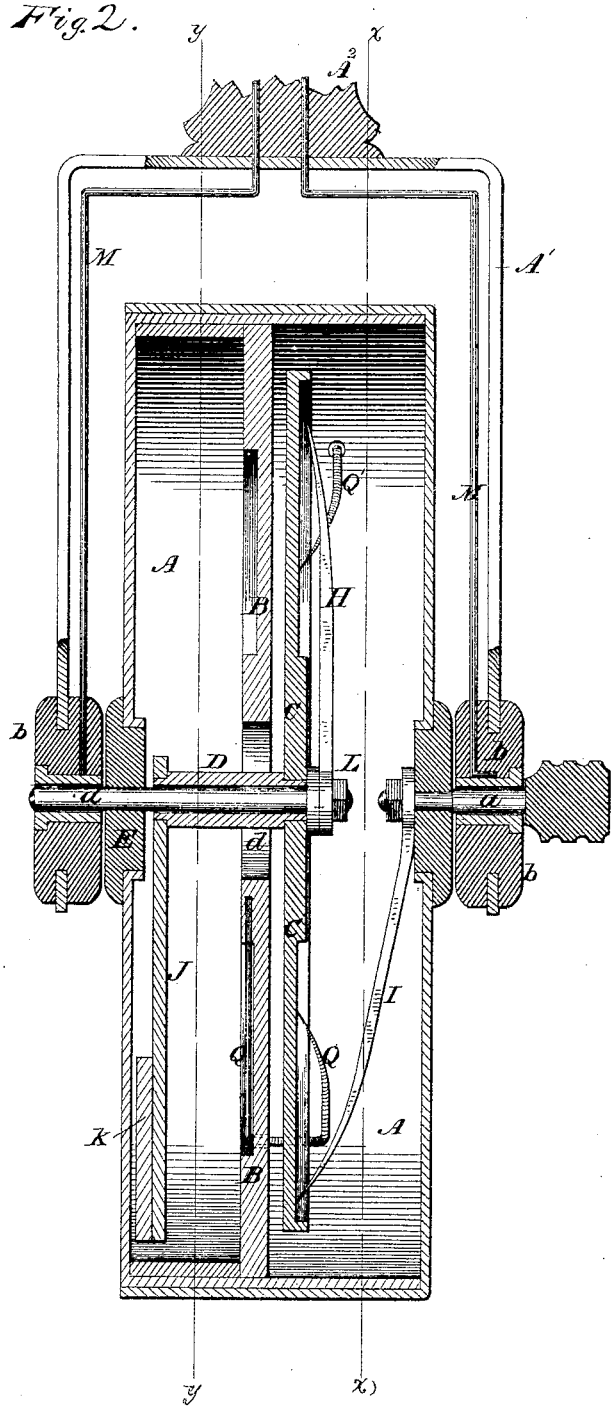

ALEXANDER R. MOLISON, OF SWANSEA, COUNTY OF GLAMORGAN, ENGLAND.

ELECTRICAL GAS-LIGHTER.

SPECIFICATION forming part of Letters Patent No. 309,971, dated December 30, 1884.

Application filed August 31, 1883. (No model.) Patented in England March 12, 1883, No. 1,295.

*To all whom it may concern:*

Be it known that I, ALEXANDER REID MOLISON, of Swansea, in the county of Glamorgan, Wales, Great Britain, have invented certain new and useful Improvements in Electrical Gas Lighters or Torches, (for which I have obtained Letters Patent in Great Britain, No. 1,295, dated March 12, 1883,) of which the following is a specification.

This invention has reference to an improved construction of electric gas lighter or torch, in which a spark of so-called "static electricity" is produced by the employment of means which effectively prevent the deposition of moisture from the air on the working parts, which feature forms the well-known cause of trouble in the ordinary friction or static machines.

My improved gas-torch is based on the principle of some of the known forms of self-charging induction-machines, by preference on the machine known as the "Voss;" and the invention consists of a hermetically-sealed box or case, within which the spark generating or inducing mechanisms are inclosed, and which is rotated in the fork of a handle.

The current-generating mechanisms are connected by insulated wires with discharging-points at the end of the tube, as will appear more fully hereinafter, and finally be pointed out in the claims.

In the accompanying drawings, Figure 1 represents a side view of my improved electric gas lighter or torch. Fig. 2 is a vertical transverse section of the same on an enlarged scale. Fig. 3 is a vertical section on line $x\ x$, Fig. 2. Fig. 4 represents a modified construction of the current-generating mechanism. Fig. 5 is a vertical section on line $y\ y$, Fig. 2.

Similar letters of reference indicate corresponding parts.

In the drawings, A represents a circular box or case, within which the mechanisms for generating electricity are arranged. This box or case is provided with center pivots, $a\ a$, that turn in bearings of a supporting fork or holder, A', that is provided with a hollow handle, A², to which latter a hollow tube, A³, of suitable length, is attached.

The box or case A is made of two or more parts, that are fitted together and hermetically sealed by means of paraffine, beeswax, resin, cement, or other suitable substance.

At the interior of the box A is arranged a disk or plate, B, that is rigidly applied to the box, and provided with center opening, $d$. One of the pivots $a$ is extended into the box and passed through the opening $d$ of the disk B, so as to support a sleeve or bearing, D, to which a second disk or plate, C, is applied. A screw-nut, L, retains the disk C on the pivot or axis $a$.

To the sleeve D is attached an arm, J, having a weight, K, at its lower end.

The disks or plates B and C form the generating apparatus, and are preferably made of a suitable non-conducting substance, preferably of hard rubber. The plate C is, by means of its sleeve D, metallically connected with the pivot $a$, which passes through an insulating-hub, F, and enters the bearing $b$ of the fork A', which bearing is also made of insulating material. This pivot or axis $a$ is, furthermore, in metallic connection with a collector, H, and acts thus as a conductor to carry the electricity to the outside of the box. A second collector, I, carries the electric spark in a similar manner to the opposite pivot, $a$.

On the disk C are arranged a number of tin-foil plates, P, of any suitable number, which alternate with uncovered sections of the disk. Four small brushes or pads, Q Q and Q' Q', of metallic tinsel or fine wire, are attached to four light springs and pressed lightly against the disk or plate C. The brushes Q' Q' are attached to the circumference of the box A, while the brushes Q are in metallic contact with armatures applied to the back of the plate or disk B, this arrangement being made in order to keep the brushes apart and insulated from each other, and in metallic contact with the two electrodes. These armatures (shown in the drawings, Fig. 5) are similar to those used in the Voss machine, heretofore referred to, and consist of two semicircular tin folios, $f\ f$.

The disks or plates B and C are depressed on their faces at the points at which the induction takes place, so as to reduce their thickness and combine thereby strength with lightness.

The armatures before referred to are arranged in the depressed portion of plate B.

M M represent insulated wires, which are shown in dotted lines in Fig. 2, and which pass from the pivots $a\ a$ through the handle and tube to the discharge-points at the end of the latter, where the sparks pass from one to the other.

If desired, the pivots of the box A may turn directly and without insulation in the prongs of the fork, in which case the prongs form parts of the conductors, and must be insulated from each other and each connected to the insulated conducting-wires which lead to the discharging-points, as shown in Fig. 4.

To work the apparatus the box is rotated either directly by the motion of the hand or by any of the well-known devices for producing rotary motion. For this purpose one or both pivots may be extended through the bearing of the supporting-fork and provided with a crank or other device, while, for example, in a gas-motor engine the discharging-points would have to be arranged in the ignition-chamber, and the box rotated by a crank and connecting-rod from the driving-shaft. When the box A is rotated, the weighted lever or arm J keeps the disk C at rest, or nearly so, while the disk B, collectors H and I, pivots $a\ a$, and brushes or loop-wires Q and Q' are rotated with the box. This is equivalent to rotating the plate C and keeping all the other parts at rest so far as the generation of electricity is concerned. The parts can also be so arranged that the plate B remains at rest, while the plate C would be rotated with the box, or so that the disk C is rotated, the other disk and the box itself being stationary, as shown in Fig. 4. In this case the insulated wires pass directly from the collectors through the box.

The advantage of my improved construction is that the means by which the electricity is generated are hermetically inclosed in the case or box, whereby the atmospheric moisture cannot exert any disturbing effect on the inducing mechanism in the box, so that the device is always ready for action and capable of furnishing a spark.

Having thus described my invention, I claim as new and desire to secure by Letters Patent—

1. The combination, with a supporting-fork, handle, and tube having terminal discharging-points, of a hermetically-sealed rotating box, and mechanisms for generating or inducing electric sparks arranged at the interior of the box, and connected metallically with the discharging-points, substantially as set forth.

2. The combination of a supporting-fork, handle, and tube having terminal discharging-points with a rotating and hermetically-sealed inclosing-box, a fixed disk or plate at the interior of the box, a loosely mounted and balanced disk having metallic plates, brushes arranged in frictional contact with the balanced disk, and collectors, the latter being connected by conducting-wires to the discharging-points, substantially as set forth.

In testimony that I claim the foregoing as my invention I have signed my name in presence of two subscribing witnesses.

ALEXR. R. MOLISON.

Witnesses:
R. B. HOWATSEN,
 *Drysalter, Swansea.*
NORMAN PLANT,
 *York Place, Swansea.*